(12) United States Patent
Loontjens

(10) Patent No.: US 7,589,136 B2
(45) Date of Patent: Sep. 15, 2009

(54) PROCESS FOR THE PREPARATION OF A POLYMER COMPOSITION

(75) Inventor: Jacobus A. Loontjens, Meerssen (NL)

(73) Assignee: DSM IP Assets B.V., Heerlen (NL)

( * ) Notice: Subject to any disclaimer, the term of this patent is extended or adjusted under 35 U.S.C. 154(b) by 348 days.

(21) Appl. No.: 10/572,371

(22) PCT Filed: Sep. 17, 2004

(86) PCT No.: PCT/NL2004/000645

§ 371 (c)(1),
(2), (4) Date: Apr. 20, 2006

(87) PCT Pub. No.: WO2005/028541

PCT Pub. Date: Mar. 31, 2005

(65) Prior Publication Data

US 2007/0010603 A1    Jan. 11, 2007

(30) Foreign Application Priority Data

Sep. 22, 2003   (EP) .................................. 03078006

(51) Int. Cl.
 *C08K 5/35* (2006.01)
 *C08K 5/1545* (2006.01)
(52) U.S. Cl. .......................................... 524/96; 524/97
(58) Field of Classification Search .................. 524/96, 524/97
See application file for complete search history.

(56) References Cited

U.S. PATENT DOCUMENTS 4,910,265 A * 3/1990 Matsumura et al. ...... 525/333.3
2004/0254270 A1 * 12/2004 Harashina .................... 524/86

FOREIGN PATENT DOCUMENTS

| EP | 0 273 368 | 7/1988 |
| EP | 0 581 642 | 2/1994 |
| EP | 0581642 (D3) | 2/1994 |
| WO | WO 96/34909 | 11/1996 |
| WO | PCT JP02/12405 | * 11/2002 |

OTHER PUBLICATIONS

PCT/NL2004/000645, International Search Report (Mar. 31, 2005).

* cited by examiner

*Primary Examiner*—Kriellion A Sanders
(74) *Attorney, Agent, or Firm*—Nixon & Vanderhye P.C.

(57) ABSTRACT

The invention relates to a process for the preparation of a polymer composition, the process comprising a step of contacting a polymer that comprises carboxyl groups with a cyclic imino ether compound characterized in that the cyclic imino ether compound is a phenylene oxazine according to formula (I), in which formula R=an oxazine group according to formula (II) n=0, 1, 2, 3, 4 or 5 and that the polymer is contacted with said oxazine in an extruder at a temperature above 100° C.

5 Claims, 1 Drawing Sheet

PROCESS FOR THE PREPARATION OF A POLYMER COMPOSITION

Figure 1:
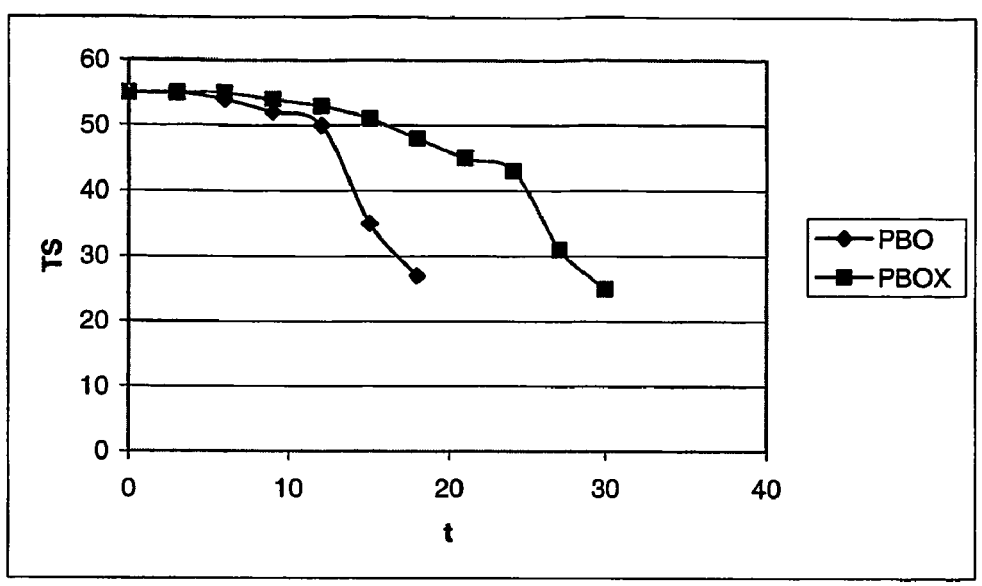

This application is the U.S. national phase of international application PCT/NL2004/000645 filed 17 Sep. 2004 which designated the U.S. and claims benefit of EP 03078006.8, dated 22 Sep. 2003, the entire content of which is hereby incorporated by reference.

The present invention relates to a process for the preparation of a polymer composition, the process comprising a step of contacting a polymer that comprises carboxyl groups and a cyclic imino ether compound. Cyclic imino ether compounds include e.g. oxazolines and oxazines which compounds can be monofunctional, bifunctional or of functionality higher than 2. Cyclic imino ether compounds react with carboxyl-groups of a polymer as a consequence of which the number of carboxylgroups in the polymer are reduced. In case of a bifunctional compound, e.g. a bisoxazoline or a bisoxazine, additionally chain extension occurs. In case of functionality higher than 2, i.e. 3 and higher, also branching and/or crosslinking occurs. Cyclic imino ether compounds are also referred to as acid scavengers.

A process for the preparation of a polymer composition comprising a polymer and a cyclic imino ether compound is known from Inata et al. as published in the Journal of Polymer Science, Vol. 30, page 3325-3337 (1985). In this publication chain extension of polyesters in round bottom flasks is disclosed whereby as chain extenders bisoxazolines and bisoxazines are used. Mentioned are 2,2'-bis(2-oxazoline), referred to by Inata as 'compound Ia', and 2,2'-bis(5, 6-dihydro-4H-1,3-oxazine), referred to as 'compound IIa', as very effective and fast reacting chain extenders. A drawback however of these said compounds is that they give rise to side reactions during production of a polymer composition resulting in e.g. discoloration. Furthermore Inata discloses polyesters comprising 2,2'-p. phenylene-bis(2-oxazoline), referred to as 'compound Ib', and 2,2'-p. phenylene-bis(5, 6-dihydro-4H-1,3-oxazine), referred to as 'compound IIb'. These two compounds are reported as having both the same reactivity, however their reactivity is far less than that of compounds Ia and IIa, too low for normal, i.e. commercially viable, production of a polymer composition. Summarizing it can be concluded that the bisoxazoline Ia and the bisoxazine IIa result in discolored polymer compositions while the phenylene bisoxazoline Ib and the phenylene bisoxazine IIb react to slow to produce polymer compositions in a fast way.

A disadvantage of the processes for the production of a polymer composition as disclosed by Inata is that it does not solve the problem of long times required for the preparation of a polymer composition with less side reactions as e.g. discoloration.

Goal of the invention therefore is to provide a process for the preparation of a polymer composition with an improved speed of reaction and which is less sensitive to side reactions as e.g. discoloration.

The inventors now have surprisingly found such a process characterized in that the cyclic imino ether compound is a phenylene oxazine according to formula (I)

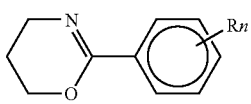

(I)

in which formula
R=an oxazine group according to formula (II)

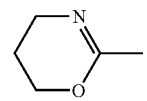

(II)

n=0, 1, 2, 3, 4 or 5 and that the polymer is contacted with said oxazine in an extruder at a temperature above 100° C.

With the process according to the invention a polymer composition is produced with an improved speed of reaction and which process is less sensitive to side reactions in the polymer composition resulting in e.g. discoloration.

A process for the preparation of a polymer composition, the process comprising a step of contacting a polymer that comprises carboxyl groups and a cyclic imino ether compound is furthermore known from EP-A-0835276. In experiments 3 and 6 polyamide compositions are obtained through mixing of 2,2'-p. phenylene-bis(2-oxazoline) or 2,2'-p. phenylene-bis(5, 6-dihydro-4H-1,3-oxazine) with a polyamide in a Haake Rheocoral kneader, i.e. a batch type kneader. It was shown in the experiments that 2,2'-p. phenylene-bis(2-oxazoline) has a slow speed of reaction, which could be increased through the additional use of a bislactam thereby making it suitable for use on extruders. The 2,2'-p. phenylene-bis(5, 6-dihydro-4H-1,3-oxazine) showed a slow speed of reaction—even on a batch kneader—which hardly could be increased through the use of a bislactam. For that reason the oxazine was not persued at all in further trials, thereby teaching away from the present invention.

Moreover a process for the preparation of a polymer composition, the process comprising a step of contacting a polymer that comprises carboxyl groups and a cyclic imino ether compound is known from EP-A-1028992. Experiment 8 in EP-A-1028992 shows an attempt to increase the molecular weight of polyethylene terephthalate, PET, through the use of 2,2'-p. phenylene-bis(2-oxazoline) as chain extender in a Brabender Plasticorder, i.e. a batch type kneader. This attempt however fails since hardly a reaction, i.e. an increase in relative viscosity, was obtained. This slow speed of reaction was overcome by the additional use of a biscaprolactam as given in experiments 11 and 12 of EP-A-1028992, resulting in an increase of the molecular weight of the PET. Again in the preparation of a polymer composition it is seen that 2,2'-p. phenylene-bis(2-oxazoline) gives a low speed of reaction resulting in long times required for the preparation of a polymer composition.

An additional advantage is that the process according to the invention can be conducted in a continuous manner as opposed to the batch process as disclosed in EP-A-1028992.

In the process according to the invention the polymer comprising carboxyl groups and the oxazine are fed to an extruder. An extruder is a continuous mixing device usually fitted with one or more screws and is as such well known to the skilled man. Optionally the extruder can be fitted with a deventing unit. Extruders are used for producing polymer compositions in the form of e.g. pellets or (semi) finished shaped parts. Several types are available in several sizes from known suppliers as e.g. Maillefer, Krupp-Werner & Pfleiderer, Leistritz and Buss. Preferably an extruder with one or two screws is used, a so-called single screw extruder and twin screw extruder respectively. More preferably a single screw extruder is used. In this way a polymer composition is produced which directly can be transferred into a shaped article. This reduces the number of steps in the production of a shaped part comprising the polymer composition according to the invention.

In the process according to the invention the polymer comprises carboxyl groups. These carboxyl groups may be present either as end groups and/or as side groups, preferably the carboxyl groups are present as end groups. Suitable polymers are well known to the skilled man and include polymers comprising aliphatic, cycloaliphatic or aromatic diacids as e.g. terephthalic acid or adipic acid as e.g. encountered in (co)polyesters or (co)polyamides. Furthermore suitable polymers comprising a carboxyl group are (co)polymers based on a lactam, e.g. caprolactam in the case of polyamide 6. Moreover copolymers, block copolymers or blends of said polymers can be used. In this way with the process according to the invention, in the case n=1 in the compound of formula (I), block copolymers or compatibilizers are produced. Polymers with carboxylic acid side groups, such as poly(meth)acrylic acid groups, are considered as well.

Before feeding the polymer comprising carboxyl groups this polymer is preferably dried to a moisture content of less than 0.05 wt % based on the total of the polymer. This enables a smooth extrusion operation.

The step of contacting a polymer that comprises carboxyl groups with a cyclic imino ether compound in the process according to the invention, is done at a temperature above 100° C. Preferably this step is done at a temperature above the melting temperature of the polymer comprising carboxyl groups. This ensures a faster reaction. The melting temperature is hereinafter defined as the temperature at the maximum of the melting peak in a differential scanning calorimetry experiment for a semi-crystalline polymer and as the temperature of the glass transition as measured during dynamic mechanical analysis for an amorphous polymer.

Increasing the temperature at which the process is run will further increase reaction speed, however generally this temperature will be chosen below 400° C., more preferably below 350° C. This results in a good balance between high speed of reaction and low speed of degradation.

In the process according to the invention a phenylene oxazine according to formula (I) is used. In the process according to the invention the phenylene oxazine according to formula (I) reacts with the polymer comprising carboxyl groups whereby the number of carboxyl groups is reduced and whereby a polymer composition is formed. An advantage is that the polymer composition shows an improved hydrolytic stability.

In the case that in formula (I) n=0 the phenylene oxazine is referred to as a phenylene mono-oxazine, when n=1 the phenylene oxazine is referred to as a phenylene bisoxazine, while if n=2 the phenylene oxazine is referred to as a phenylene tris-oxazine.

An advantage of using a phenylene oxazine according to formula (I) in which n is at least 1 is that additionally chain extension takes place, while if n is at least 2 additionally branching and/or crosslinking occurs.

A polymer composition that is branched has an increased melt strength. This is advantageous in processing the polymer composition via e.g. blow molding or filmextrusion into film, sheet and rods.

A polymer composition which can crosslink is very suitable for e.g. coatings. In this case the polymer composition preferably still comprises unreacted cyclic imino ether according to formula (I). The presence of unreacted cyclic imino ether compound in the polymer composition obtained with the process according to the invention is achieved by choosing a low temperature, e.g. close to 100° C., during the step of contacting the polymer that comprises carboxyl groups with said cyclic imino ether according to formula (I), combined with a short residence time. The exact time and temperature can be easily determined by a skilled man through routine experiments.

In the process according to the invention reaction times generally are about equal to the residence time in the extruder. The residence time in an extruder generally is short, usually less than 15 minutes, preferably less than 5 minutes, more preferably less than 3 minutes and most preferably less than 2 minutes. This enables lower production costs. Residence in an extruder is determined by feeding a coloured polymer pellet together with uncoloured polymer pellets through the hopper of an extruder and measuring the time until the colour of the coloured polymer pellet is seen at the extruder exit.

In the process according to the invention the amount of the oxazine can be chosen within wide ranges, generally however a range of 0.01 to 10 wt %, based on the polymer, is chosen. Preferably the amount of the oxazine groups is equal to the amount of carboxylic groups. In the case of a bisoxazine this means that the molar amount of a bisoxazine according to formula (I) is half of the molar amount of carboxylic groups in the polymer.

To prevent the amount of the oxazine groups in the process according to the invention to become less than the amount of carboxylic groups, e.g. due to losses in the process, optionally a concentration higher than equimolar, e.g. 50% higher, can be chosen. The polymer composition obtained with the process of the invention is, due to its improved hydrolytic stability, very suitable for applications in an environment comprising with water, either as liquid or gas, or acid.

This polymer composition can furthermore comprise additives as usually applied in polymer production as e.g. antioxidants; lubricants; colorants; fillers and reinforcing agents as e.g. glass fibers, kaolin, mica; other polymers as e.g. rubbers; flame retardants and bifunctional reactants as e.g. carbonylbislactam. Generally the polymer composition obtained with the process of the invention will be applied in the form of a shaped part. Applications range from e.g. monofilaments, e.g. in filters in paper making machines; industrial yarns or films, especially in humid applications and/or at higher temperatures; parts in a cooling system of e.g. a car; parts which come into contact with fluids which are acidic or become acidic upon ageing, e.g. oils, an example of which is e.g. a gearwheel in a gearbox comprising motor oil.

In the drawings FIG. 1 represents the results of a hydrolysis test in which tensile strength TS [in MPa] of polymer compositions is depicted as function of immersion time t [in days] in water of 80° C.

The invention will be further elucidated with the following, non limiting, comparative experiments and example.

Comparative Experiment A

Polyethylene terephthalate (PET ex DSM: relative viscosity 1.59 measured in m-cresol (0.5 g 100 ml) at 25° C., carboxyl endgroups=34 meq/kg (as measured by titration), hydroxyl endgroups=47 meq/kg) was ground and subsequently dried at 140° C. during 48 hours under vacuum (<200 mbar) and nitrogen leak. 17 mmol/kg of 2,2'-bis(2-oxazoline) (Tokyo Kasei Organic Chemicals) was dissolved in tetrahydrofurane (THF) and this was spread over the ground PET after which the THF was evaporated at 50° C. under vacuum (<200 mbar) during 18 hours, thereby obtaining a PET/2,2'-bis(2-oxazoline) mixture. This mixture was fed to a laboratory extruder at which the PET/2,2'-bis(2-oxazoline) mixture was extruded at 280° C. into a strand and cut into pellets. Residence time in the extruder was 90 seconds. During this period the torque of the extruder increased with 75% compared to extruding PET without additives. The relative viscosity was 1.76. This represents a good speed of reaction. The number of carboxyl endgroups was reduced to 15 meq/kg. The extruded pellets were discoloured and had a yellow/brownish colour.

With the process according to comparative experiment A, a polymer composition is produced with a good speed of reaction, however this process results in a polymer composition that is sensitive to discoloration.

Comparative Experiment B

Comparative experiment A was repeated with instead of using 2,2'-bis(2-oxazoline), 2,2'-p. phenylene-bis(2-oxazoline) (Palmarole AG) was used (in an amount of 17 mmol/kg of PET resin).

Processing conditions remained the same as in Comparative experiment A. Hardly any torque increase (+8% compared to extruding PET without additives) during extrusion was seen.

The relative viscosity was 1.61, measured in m-cresol, and the number of carboxyl endgroups were 25 meq/kg. Colour of the extruded pellets was slightly discoloured to light yellow.

With the process according to comparative experiment B a polymer composition is produced with a low speed of reaction and which process results in a polymer composition that is less sensitive to discoloration.

Test bars were produced by injection moulding at a melt temperature of 295° C. and a mould temperature of 135° C. Hydrolytic stability of these test bars was evaluated by immersion of the test bars in water of 80° C. and by measuring tensile strength as a function of immersion time. The results are given in FIG. 1 (referred to as 'PBO') in which tensile strength, TS, in MPa is given as function of immersion time t in days.

EXAMPLE 1

Comparative experiment A was repeated however instead of using 2,2'-bis(2-oxazoline), 2,2'-p. phenylene-bis(5, 6-dihydro-4H-1,3-oxazine) was used (in an amount of 17 mmol/kg of PET resin).

The 2,2'-p. phenylene-bis(5, 6-dihydro-4H-1,3-oxazine) was produced through the following method:

A 20 L 5-neck round bottom flask was charged with 500 g (3.90 mol) 1,4-dicyanobenzene, 9.75 g (0.033 mol) zinc nitrate hexahydrate and 3L (39.2 mol) 3-amino-1-propanol. The reaction mixture was stirred and heated to 120° C. while nitrogen was purged over the reaction mixture. The starting material dissolves completely in the 3-amino-1-propanol when a temperature of 115° C. is reached. The temperature of the reaction mixture was raised until 134° C. and was stirred overnight at this temperature. The temperature of the reaction mixture was cooled to 82° C. and subsequently 4.5 L water (pH 4.5-5.0 acidified with 12 M hydrochloric acid) and 8.5 liter toluene were added. The solvents were separated using a 20 L separatory funnel. The toluene layer was dosed in the 20 L 5 neck round bottom flask and 2.5 L acidified water (pH 4.5-5.0 using 12 M hydrochloric acid) was added and the resulting mixture stirred at room temperature for 15 minutes. The solvents were separated using the 20 L separatory funnel resulting in a toluene layer containing a high purity product (LC, 98.5%, area-%).

During the production of the polymer composition, processing conditions remained the same as in Comparative experiment A. During this processing the torque of the extruder increased with 85% compared to extruding PET without additives.

The relative viscosity was 1.77 measured in m-cresol, which represents a good speed of reaction, and the number of carboxyl endgroups was 10 meq/kg.

The extruded pellets were not discoloured and had a bright colour. With this process according to the invention a polymer composition is produced with an improved speed of reaction especially compared to comparative experiment B and which process results in a polymer composition that is hardly sensitive to discoloration.

Testbars were produced by injection moulding at a melt temperature of 295° C. and a mould temperature of 135° C. Hydrolytic stability of these testbars was evaluated by immersion of the test bars in water of 80° C. and by measuring tensile strength as a function of immersion time. The results are given in FIG. 1 (referred to as 'PBOX') in which tensile strength, TS, in MPa is given as function of immersion time t in days.

The better hydrolytic stability is evident from the better retention of tensile strength of this sample as compared to the sample of comparative experiment B.

The invention claimed is:

1. Process for the preparation of a polymer composition, the process comprising contacting a polymer that comprises carboxyl groups with a cyclic imino ether compound, wherein the cyclic imino ether compound is a phenylene oxazine according to formula (I)

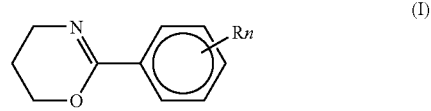

(I)

in which formula

R=an oxazine group according to formula (II)

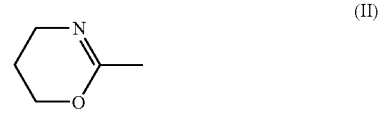

(II)

n=0, and wherein the polymer is contacted with said oxazine in an extruder at a temperature above 100° C., and wherein the concentration of the oxazine is 0.01-5 wt % relative to the amount of the polymer.

2. Process according to claim 1 wherein the polymer is a (co)polyamide, a (co)polyester or a blend hereof.

3. Process according to claim 1, wherein the extruder is a single or a twin screw extruder.

4. Process according to claim 3, wherein the extruder is a single screw extruder.

5. A coating which comprises the polymer composition prepared by the process according to claim 1.

* * * * *